(12) United States Patent
Togami et al.

(10) Patent No.: US 8,920,048 B2
(45) Date of Patent: Dec. 30, 2014

(54) COMMUNICATIONS MODULE WITH A SHELL ASSEMBLY HAVING THERMAL MECHANICAL FEATURES

(75) Inventors: Chris K. Togami, San Jose, CA (US); Frank J. Flens, Campbell, CA (US); Tat Ming Teo, Compassvale Link (SG)

(73) Assignee: Finisar Corporation, Sunnyvale, CA (US)

( * ) Notice: Subject to any disclaimer, the term of this patent is extended or adjusted under 35 U.S.C. 154(b) by 740 days.

(21) Appl. No.: 13/116,591

(22) Filed: May 26, 2011

(65) Prior Publication Data

US 2011/0228483 A1    Sep. 22, 2011

Related U.S. Application Data

(63) Continuation-in-part of application No. 12/717,352, filed on Mar. 4, 2010, and a continuation-in-part of application No. 12/468,790, filed on May 19, 2009, now Pat. No. 8,057,109.

(60) Provisional application No. 61/262,049, filed on Nov. 17, 2009.

(51) Int. Cl.
*G02B 6/36* (2006.01)
*G02B 6/42* (2006.01)

(52) U.S. Cl.
CPC ............ *G02B 6/4246* (2013.01); *G02B 6/4292* (2013.01)
USPC .............................................. 385/93; 385/88

(58) Field of Classification Search
None
See application file for complete search history.

(56) References Cited

U.S. PATENT DOCUMENTS

| 7,121,743 | B2 * | 10/2006 | Mizue | 385/92 |
|---|---|---|---|---|
| 7,308,206 | B2 * | 12/2007 | Larson | 398/164 |
| 7,365,923 | B2 * | 4/2008 | Hargis et al. | 359/820 |
| 8,057,109 | B2 * | 11/2011 | Flens et al. | 385/92 |
| 8,292,518 | B2 * | 10/2012 | Togami et al. | 385/86 |
| 8,328,435 | B2 * | 12/2012 | Teo et al. | 385/92 |
| 8,459,881 | B2 * | 6/2013 | Togami et al. | 385/92 |
| 8,509,622 | B2 * | 8/2013 | Zhong | 398/117 |
| 8,672,562 | B2 * | 3/2014 | Ishii et al. | 385/92 |
| 2005/0158052 | A1 * | 7/2005 | Larson | 398/135 |
| 2005/0162761 | A1 * | 7/2005 | Hargis et al. | 359/820 |
| 2010/0080518 | A1 * | 4/2010 | Teo et al. | 385/92 |
| 2010/0296817 | A1 * | 11/2010 | Togami et al. | 398/139 |
| 2011/0228483 | A1 * | 9/2011 | Togami et al. | 361/714 |
| 2011/0293284 | A1 * | 12/2011 | Zhong | 398/135 |

\* cited by examiner

*Primary Examiner* — Rhonda Peace
(74) *Attorney, Agent, or Firm* — Maschoff Brennan (57) ABSTRACT

In an embodiment, a shell assembly for a communications module is described that includes a top shell, a bottom shell, and a thermal boss. The top shell has a top panel and opposing lateral side portions. The bottom shell has a bottom panel and opposing lateral side portions. The top shell and the bottom shell are configured to be assembled together to define a cavity therebetween. The cavity may be configured to receive a transceiver assembly. The thermal boss extends from the top panel and includes a thermal interface surface defining a thermal interface plane oriented at an angle relative to the top panel.

22 Claims, 6 Drawing Sheets

Fig. 3C

COMMUNICATIONS MODULE WITH A SHELL ASSEMBLY HAVING THERMAL MECHANICAL FEATURES

CROSS REFERENCE TO RELATED APPLICATIONS

The present application is a continuation-in-part of U.S. patent application Ser. No. 12/717,352 filed on Mar. 4, 2010, which claims the benefit of and priority to U.S. patent application Ser. No. 61/262,049 filed on Nov. 17, 2009.

The present application is also a continuation-in-part of U.S. patent application Ser. No. 12/468,790 filed on May 19, 2009.

The foregoing applications are incorporated herein by reference in their entireties.

BACKGROUND

1. Field of the Invention

Some embodiments relate generally to communications modules. More particularly, example embodiments relate to communications modules that include shell assemblies having thermal mechanical features for removing heat generated by operation of the communications module.

2. Related Technology

Communications modules, such as electronic/optoelectronic transceiver or transponder modules, are increasingly used in electronic and optoelectronic communication. Some modules are pluggable, which permits the module to be inserted into and removed from a receptacle of a host device, such as a host computer, switching hub, network router, or switch box. Some host devices include multiple receptacles and can therefore accommodate multiple modules simultaneously. Each module typically communicates with a printed circuit board of the host device by transmitting and/or receiving electrical data signals to and/or from the host device printed circuit board. These electrical data signals can also be transmitted by the module outside the host device as optical and/or electrical data signals.

As a module transmits and/or receives data, the module generates heat. As more components positioned within the modules transmit and/or receive data, the module generates more heat. If the heat generated becomes excessive, it can negatively affect the operation of the module.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Some embodiments generally relate to a communications module that includes a shell assembly having thermal mechanical features for removing heat generated by operation of the communications module.

In an embodiment, a shell assembly for a communications module is described that includes a top shell, a bottom shell, and a thermal boss. The top shell has a top panel and opposing lateral side portions. The bottom shell has a bottom panel and opposing lateral side portions. The top shell and the bottom shell are configured to be assembly together to define a cavity therebetween. The cavity may be configured to receive a transceiver assembly. The thermal boss extends from the top panel and includes a thermal interface surface defining a thermal interface plane oriented at an angle relative to the top panel.

In an embodiment, a communications module is described that includes a transceiver assembly and a shell assembly. The transceiver assembly has at least one printed circuit board defining a printed circuit board interface plane and a transmitter/receiver assembly coupled to the printed circuit board. The transmitter/receiver assembly is oriented at a first angle relative to the printed circuit board interface plane. The shell assembly defines a cavity therein. The transceiver assembly is positioned within the cavity. The shell assembly also includes a thermal boss. The thermal boss includes a thermal interface surface that defines a thermal interface plane. The thermal interface plane is oriented at a second angle relative to the printed circuit board interface plane.

In an embodiment, a communications module is described that includes a shell, a thermal boss, a transceiver assembly, and a biasing member. The shell assembly has a top panel, a bottom panel, and opposing lateral sides defining a cavity therebetween. The thermal boss extends from the top panel and includes a thermal interface surface that defines a thermal interface plane oriented at a first angle relative to the top panel. The transceiver assembly has at least one printed circuit board that defines a printed circuit board interface plane. The printed circuit board interface plane is substantially parallel to the top panel. The transceiver assembly also has a transmitter/receiver assembly coupled to the printed circuit board and oriented at a second angle relative to the printed circuit board interface plane. The second angle is substantially equal to the first angle. The biasing member is configured to bias the transmitter/receiver assembly into contact with the thermal interface surface.

Additional features of the invention will be set forth in the description which follows, and in part will be obvious from the description, or may be learned by the practice of the invention. The features of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

A module is provided herein that includes a shell assembly having thermal mechanical features according to some embodiments. In at least one example, the shell assembly is configured to house a transceiver assembly. The transceiver assembly has one or more printed circuit boards that are oriented in or parallel to a printed circuit board interface plane. The thermal mechanical features include a thermal boss having an interface plane that is oriented at an angle to the printed circuit board interface plane. For example, the interface plane of the thermal boss can be generally perpendicular to the printed circuit board interface plane. The thermal boss can also include an angled surface that extends away from the interface plane to the rest of the shell assembly such that a thermal pathway is established from the thermal boss to the rest of the shell assembly. Such a configuration can allow the shell assembly to efficiently remove heat generated by operation of the module.

The embodiments described herein can be implemented in various communications modules, including electrical modules and optoelectronic modules. As used herein, the term "optoelectronic module" includes modules having both optical and electrical components. Examples of electronic and optoelectronic modules include, but are not limited to, active electrical cables, active optical cables, transponders, transceivers, transmitters, and/or receivers. Electronic and optoelectronic modules can be used, for instance, in telecommunications networks, local area networks, metro area networks, storage area networks, wide area networks, and the like and can be configured to conform with one or more standardized form factors or multi-source agreements ("MSAs"), including the CXP, CFP, XFP and SFP+ form factors, without restriction. It will be appreciated, however, that the electronic and optoelectronic modules need not comply with standardized form factor requirements and may have any size or configuration necessary according to a particular design.

The communications modules according to some embodiments can be configured for electrical and/or optical signal transmission and reception at a variety of per-second data rates including, but not limited to, 10 Gigabits per second ("G"), 40 G, 100 G, or higher. As used herein, the terms "10 G", "40 G", "100 G", and similar terms represent rounded approximations of common signaling rates and have the meanings commonly understood by those of skill in the art.

Furthermore, the communications modules according to some embodiments can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the communications modules can be configured to support various transmission standards including, but not limited to, 10 Gigabit Ethernet, 100 Gigabit Ethernet, 1x, 2x, 4x, 10x, and 16x Fibre Channel, and 1x, 4x and 12x SDR, DDR and QDR Infiniband.

Reference will now be made to the drawings wherein like structures will be provided with like reference designations. It should be understood that the drawings are diagrammatic and schematic representations of exemplary embodiments and, accordingly, are not limiting of the scope of the present invention, nor are the drawings necessarily drawn to scale.

Figure 1A:
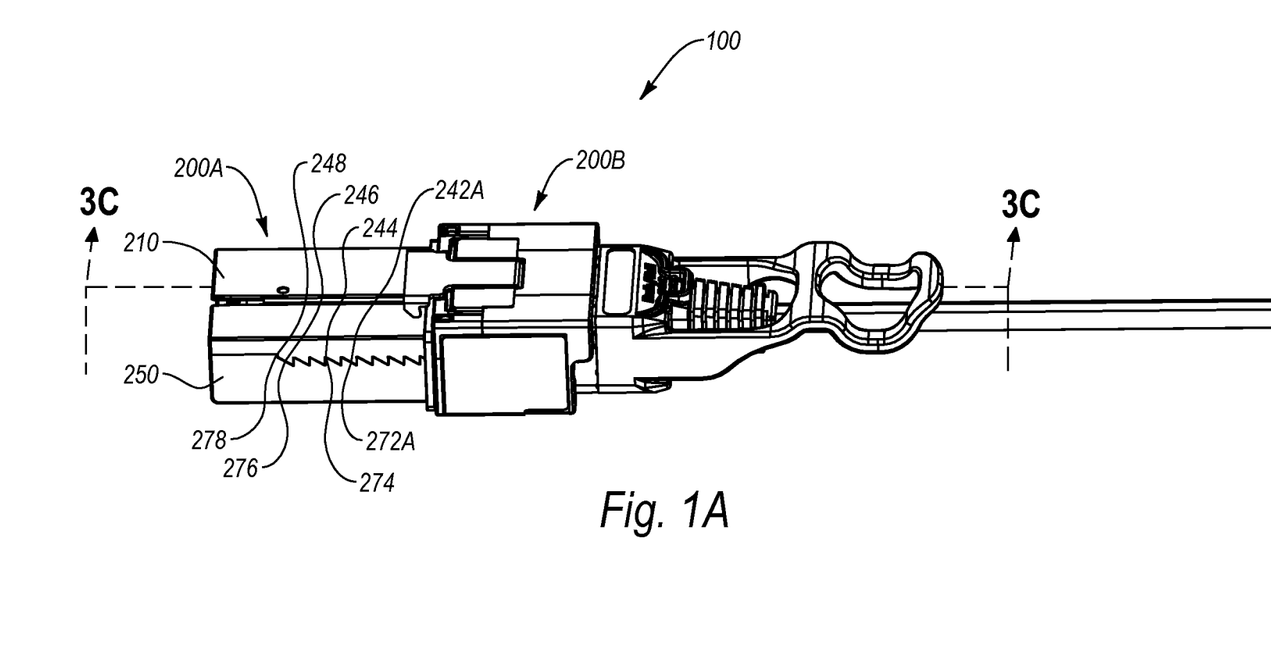
FIGS. 1A-1B illustrate an example module in which a shell assembly having thermal mechanical features can be implemented.
Figure 1B:
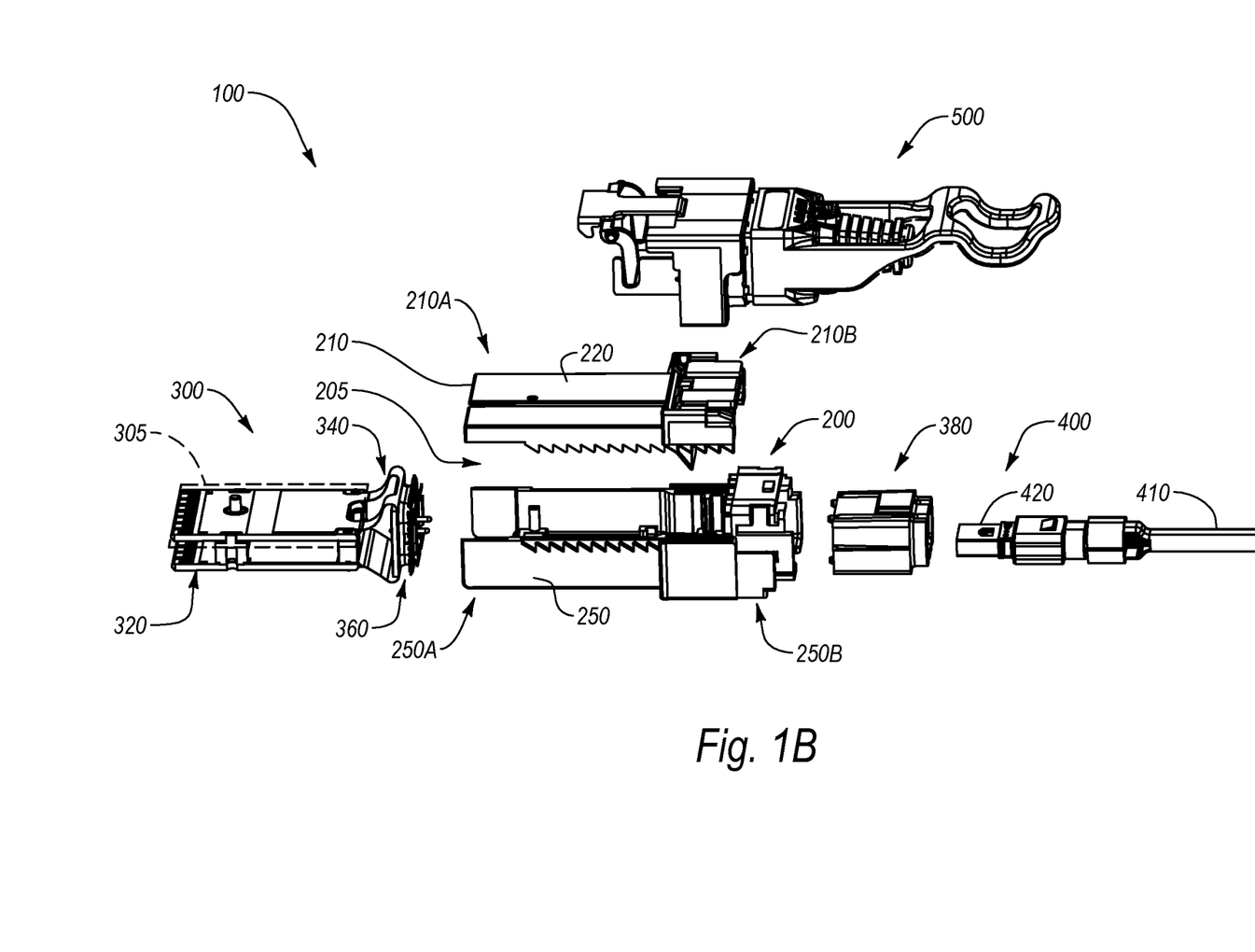

Reference is first made to FIGS. 1A-1B, which depict an example communications module 100 ("module 100"). FIGS. 1A-1B show, respectively, a perspective view and an exploded front perspective view, of the module 100. As illustrated in FIG. 1B, the module 100 includes a shell assembly 200, a transceiver assembly 300, a cable assembly 400, and a latching mechanism 500. The shell assembly 200, the transceiver assembly 300, and the latching mechanism 500 will be described as separate assemblies, though it will be appreciated that these assemblies can be combined and/or integrated in any desired manner.

The latching mechanism 500 engages additional structure associated with a host device (not shown) to selectively engage and disengage the module 100 as desired. As will be discussed in more detail below, the shell assembly 200 includes structure providing a thermal pathway to effectively transfer thermal energy generated by the operation of the transceiver assembly 300 out of the transceiver module 100. More specifically, the shell assembly 200 can be configured to be placed in communication with a heat sink, such as a heat sink associated with the host device, such as a multi-source agreement (MSA) defined heat sink.

As illustrated in FIG. 1B, the shell assembly 200 generally includes a top shell 210 and a bottom shell 250. In particular, the shell assembly 200 generally includes a first end 200A and a second end 200B (best seen in FIG. 1A) such that the top shell 210 includes a first end 210A and a second end 210B while the bottom shell 250 also includes a first end 250A and a second end 250B. When assembled, the top shell 210 and the bottom shell 250 form a cavity 205 therebetween that is configured to house and support the transceiver assembly 300. Although the shell assembly 200 is illustrated and described as being made up of two components (i.e., top shell 210 and bottom shell 250), the shell assembly 200 can alternately or additionally be made up of a unitary component and/or three or more components.

In at least one example, the transceiver assembly 300 can include a printed circuit board (PCB) assembly 320, a flex circuit assembly 340, and a transmitter/receiver assembly 360 that is configured to be coupled to an alignment guide 380. In the illustrated example, the shell assembly 200 houses the transceiver assembly 300 and maintains the PCB assembly 320 in a proper orientation for coupling to a host device (not shown). Further, the alignment guide 380 orients the cable assembly 400 relative to the transmitter/receiver assembly 360 to help ensure proper coupling of the cable assembly 400 to the transmitter/receiver assembly 360 and thus of the cable assembly 400 to the module 100.

When coupled to the cable assembly 400 and the host device (not shown), the transceiver assembly 300 can transmit and receive optical signals in connection with the host device (not shown) that is operatively connected in some embodiments to a communication network (not shown) by way of the cable assembly 400. While such a configuration is described in more detail herein, it will be appreciated that additional configurations are possible that include a shell assembly 200 configured to provide a thermal pathway for efficient removal of thermal energy generated by operation of the transceiver assembly 300 in general and of the transmitter/receiver assembly 360 in particular. An example configuration of the shell assembly 200 will first be discussed with reference to FIGS. 2A-2B followed by a discussion of an example configuration of the transceiver assembly 300 with reference to FIGS. 3A-3B.

Figure 2A:
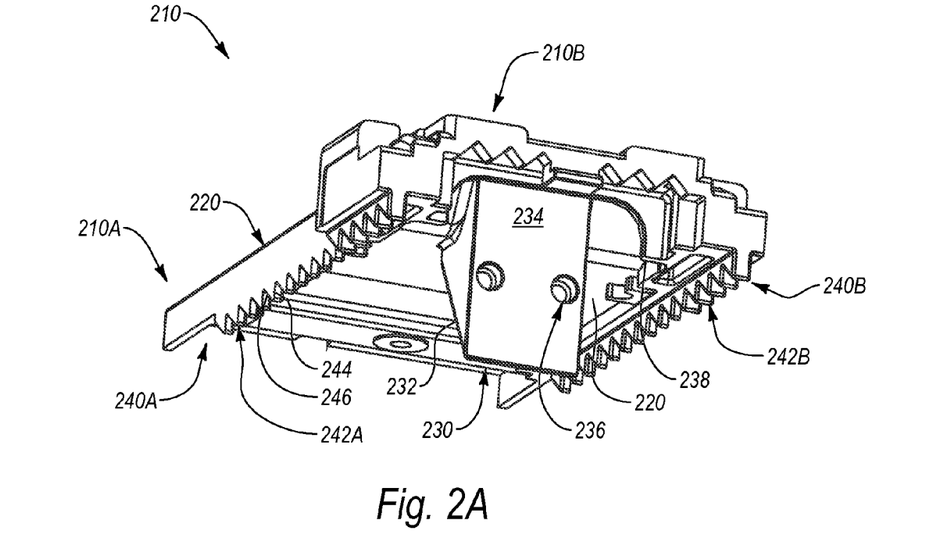
FIGS. 2A-2B illustrate an example of the shell assembly of FIGS. 1A-1B in additional detail.

FIG. 2A illustrates the top shell 210 in more detail. As illustrated in FIG. 2A, the first end 210A of the top shell 210 forms a panel 220. The panel 220 can define a plane that is generally parallel to a PCB interface plane 305 associated with the PCB assembly 320 (FIG. 1B).

As illustrated in FIG. 2A, the top shell 210 includes a thermal boss 230. For example, the thermal boss 230 can extend away from the panel 220 in such a manner that the thermal boss 230 includes an angled portion 232 that is oriented at an angle relative to the panel 220. The thermal boss 230 can also include a generally planar interface 234 that is also oriented at an angle relative to the panel 220. In at least one example, the planar interface 234 is generally perpendicular to the panel 220.

The planar interface 234 can include any number of holes 236 defined therein. The holes 236 can be sized and shaped to receive alignment members configured to aid in alignment of various components to the shell assembly 200 (FIG. 1B) as well as other components. Further, the top shell 210 also includes a ridge 238 near the second end 210B that is configured to limit advancement of the alignment guide 380 (FIG. 1B). Limiting the advancement of the alignment guide 380, or other components, can help position the alignment guide 380 in a desired position. Accordingly, the top shell 210 includes various features to aid in alignment of other components.

The top shell 210 also includes opposing lateral side portions 240A, 240B. Each of the lateral side portions 240A, 240B includes engagement features 242A, 242B. The engagement features 242A, 242B are configured to engage corresponding features 272A, 272B in the bottom shell 250 (FIG. 2B) to help maintain the top shell 210 in a desired position relative to the bottom shell 250. In the illustrated example, the engagement features 242A, 242B can include a leading edge 244 and an angled trailing edge 246.

In at least one example, the trailing edge 246 of one of the engagement features 242A, 242B is in communication with the leading edge 244 of an adjacent engagement feature 242A, 242B such that the engagement features 242A, 242B have a repeating saw-tooth pattern. Such a configuration can allow the top shell 210 to be moved into desired position relative to the bottom shell 250, as will be described in more detail below.

Figure 2B:
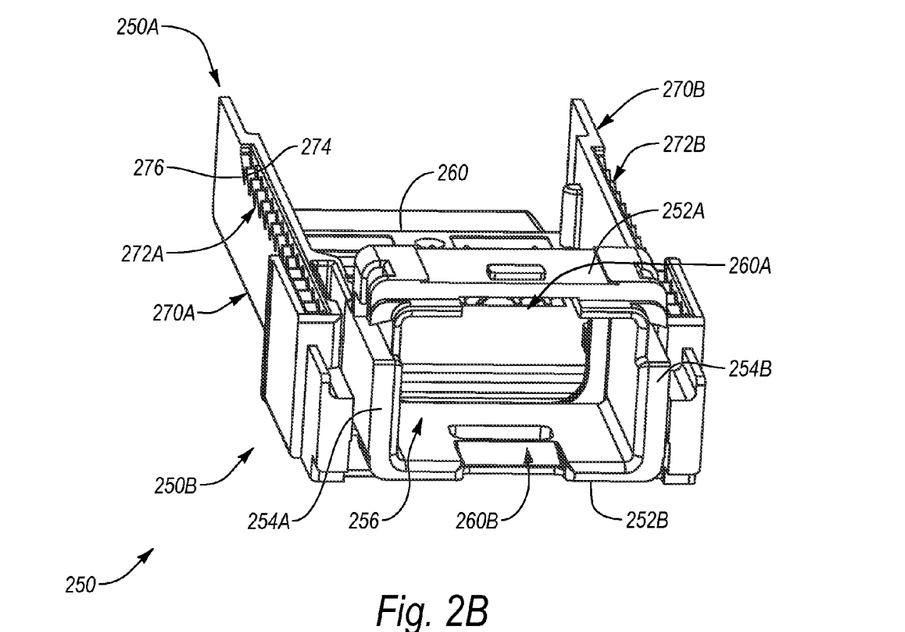

FIG. 2B illustrates a top perspective view showing the bottom shell 250 in more detail. As illustrated in FIG. 2B, the first end 250A of the bottom shell 250 can form a panel 260. The second end 250B of the bottom shell 250 is configured to receive the alignment guide 380 (FIG. 1B). In particular, the second end 250B includes a top portion 252A, a bottom portion 252B, and opposing side portions 254A, 254B extending between the top portion 252A and the bottom portion 252B to thereby define an enclosure 256 configured to receive the alignment guide 380 (FIG. 1B) therein. In at least one example, the enclosure 256 is sized such that when the alignment guide 380 (FIG. 1B) is inserted into the second end 250B, the second end 250B engages the alignment guide 380 (FIG. 1B) to resist retraction of the alignment guide 380.

The second end 250B also includes structure to constrain the position of the alignment guide 380 (FIG. 1B) therein. In particular, the second end 250B can include any number of registering or receiving surfaces, such as engagement recesses 260A, 260B defined in the top and bottom portions 252A, 252B respectively of the second end 250B. The engagement recesses 260A, 260B can be configured to receive corresponding features on the alignment guide 380 (FIG. 1B) to constrain the advancement of the alignment guide 380 (FIG. 1B).

Accordingly, the second end 250B can be configured to receive and maintain the alignment guide 380 (FIG. 1B) in a desired position and orientation. Such a configuration can allow the alignment guide 380 (FIG. 1B) to provide a base from which the transmitter/receiver assembly 360 (FIG. 1B) can be biased into engagement with the thermal boss 230 (FIG. 2A) associated with the top shell 210, while maintaining alignment between the cable assembly 400 (FIG. 1B) and the transceiver assembly 300.

As also shown in FIG. 2B, the bottom shell 250 also includes opposing lateral side portions 270A, 270B. Each of the lateral side portions 270A, 270B includes engagement features 272A, 272B. In the illustrated example, the engagement features 272A, 272B can include a leading edge 274 and an angled trailing edge 276. In at least one example, the trailing edge 276 of one of the engagement features 272A, 272B is in communication with the leading edge 274 of an adjacent engagement feature 272A, 272B such that the engagement features 272A, 272B have a repeating saw tooth pattern. The engagement features 272A, 272B, together with the engagement features 242A, 242B of the top shell 210 may be configured to provide electromagnetic interference (EMI) containment as disclosed in U.S. patent application Ser. No. 12/616,060, filed Nov. 10, 2009 and entitled "Electromagnetic Shielding Configuration," the disclosure of which is incorporated herein by reference in its entirety.

As shown in FIG. 1A, the engagement features 272A (272B, not shown) are configured to engage corresponding engagement features 242A (242B, not shown) in the bottom shell 250 to help maintain the top shell 210 in a desired position relative to the bottom shell 250. In particular, the trailing edges 246 of the engagement features 242A can be positioned against the trailing edges 276 of the engagement features 272A. Thereafter, the top shell 210 can be moved toward the bottom shell 250 to thereby register the leading edges 244 of the engagement features 242A against the leading edges 274 of the engagement features 272A. In at least one example, moving the leading edges 244 of the engagement features 242A into contact with the leading edges 274 of the engagement features 272A can align the top shell 210 relative to the bottom shell 250.

Further, as shown in FIG. 1A, the top shell 210 can also include one or more shoulder portion 248 while the bottom shell 250 can include one or more shoulder portion 278. Engagement between the shoulder portions 248, 278 as shown can help maintain the engagement features 242A, 272A in contact as shown and help prevent the top shell 210 from moving away from the bottom shell 250. Maintaining the top shell 210 positioned relative to the bottom shell 250 can maintain the top shell 210, and the thermal boss 230 (FIG. 2A) in particular, in place relative to the transceiver/transmitter assembly 360 and the alignment guide 380 (both shown in FIG. 1B). The configuration of the transceiver assembly 300 will now be discussed in more detail, followed by a discussion of the interaction of transceiver assembly 300 with the shell assembly 200 and other components.

Figure 3A:
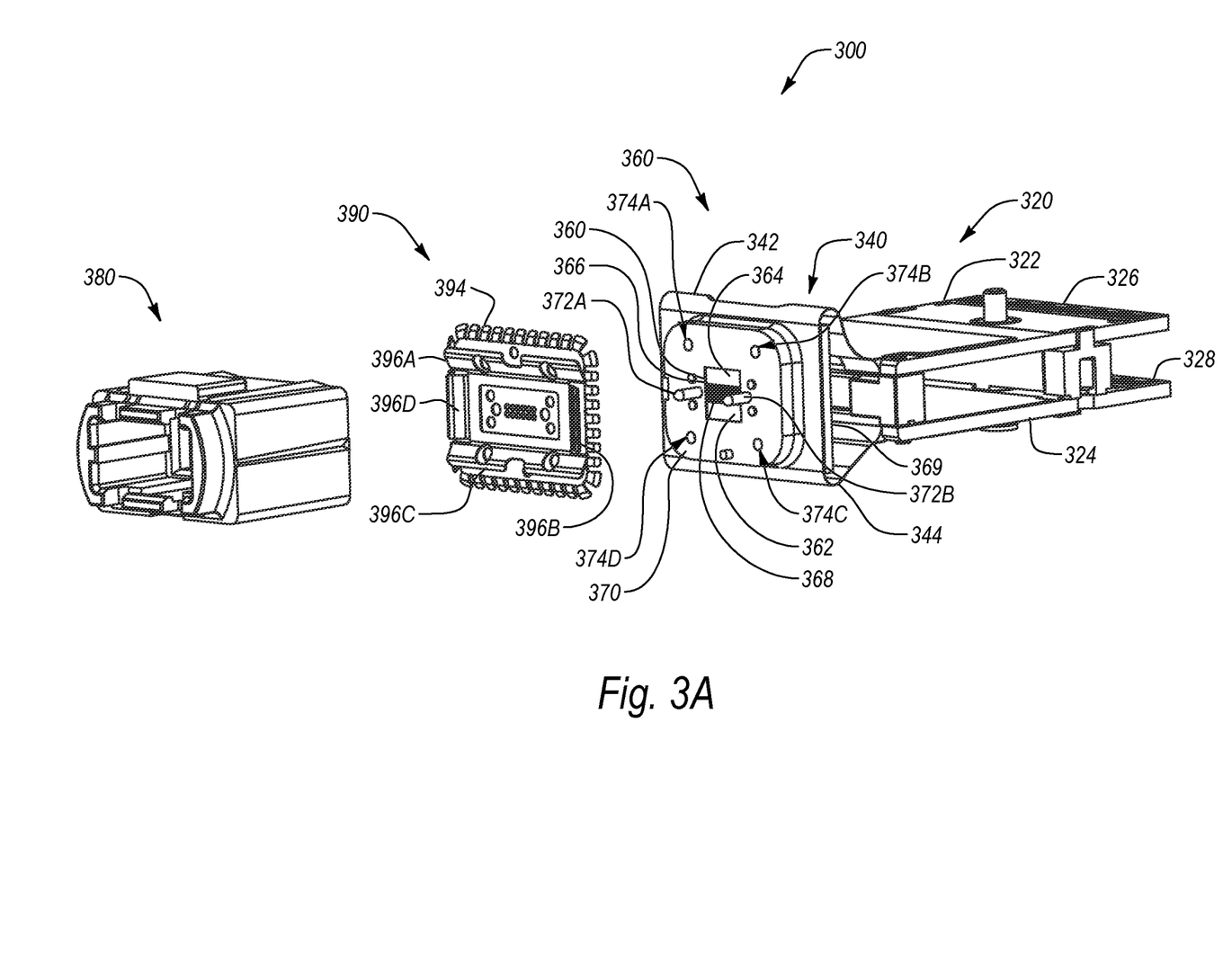
FIGS. 3A-3B illustrate an example of a transceiver assembly that can be implemented with a module having a shell assembly with thermal mechanical features according to some embodiments.
Figure 3B:
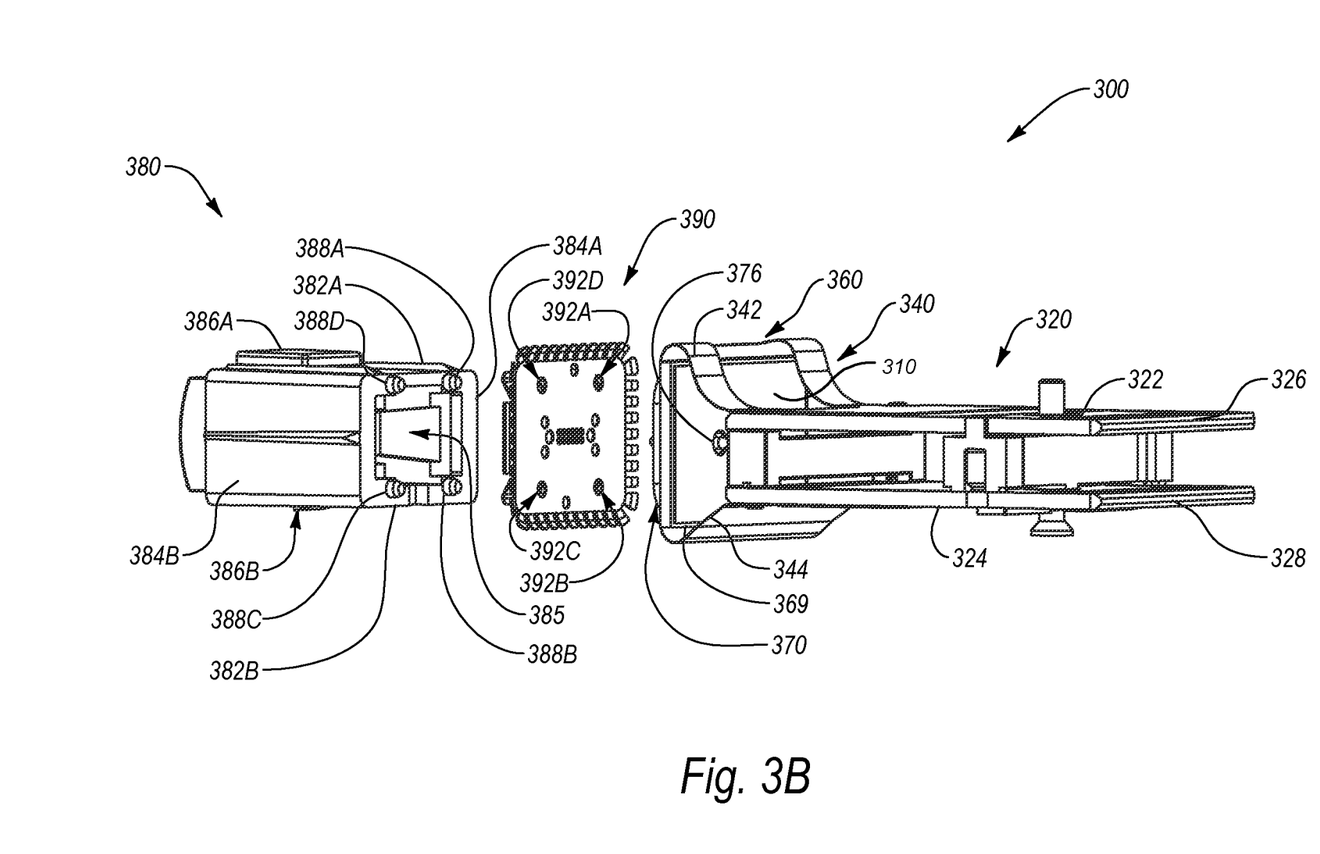

FIGS. 3A and 3B illustrate the transceiver assembly 300 in more detail. As previously introduced, the transceiver assembly 300 includes the printed circuit board (PCB) assembly 320, the flex circuit assembly 340, the transmitter/receiver assembly 360, and the alignment guide 380.

The PCB assembly 320 includes, among other things, printed circuit boards 322, 324 that include edge connectors 326, 328. The edge connectors 326, 328 interface with a host device to communicate electrical data signals between the host device and the communications module 100 (FIG. 1A). The printed circuit boards 322, 324 are coupled to the transmitter/receiver assembly 360 by way of flex circuits 342, 344 of the flex circuit assembly 340.

In the illustrated example, the transmitter/receiver assembly 360 includes a laser driver 362, an amplifier 364, at least one optical receiver 366, and at least one optical transmitter 368 that are positioned on an integrated circuit (IC) plate 369 while extending into or through a lens block 370. In this and some other examples, the optical transmitter 368 is a 12×1 array of vertical cavity surface emitting lasers ("VCSELs") and the optical receiver 366 is a 12×1 array of p-type, intrinsic, n-type ("PIN") photodiodes. Alternately, the optical transmitter 368 can include other types of optical transmitters, such as edge-emitting lasers, in the same or different quantities or configurations. Similarly, the optical receiver 366 can alternately include other types of optical receivers in the same or different quantities or configurations. In other embodiments, the transceiver assembly 300 implements electrical transmitters and receivers, rather than optical transmitters and receivers 368, 366.

Electrical data signals received from the host device are provided to the laser driver 362, which drives the optical transmitter 368 to emit optical data signals representative of the received electrical data signals. Alternately or additionally, optical data signals can be received by the optical receiver 366 which converts the received optical data signals to electrical data signals and provides the electrical data signals to the amplifier 364 for amplification prior to being communicated to the host device via one or both of edge connectors 326, 328. The amplifier 364 may include, for instance, a transimpedance amplifier (TIA), a post amplifier, or other suitable amplifier.

In the illustrated example, the lens block 370 includes a plurality of alignment features, that can include, without limitation, overmolded lens pins 372A, 372B as well as alignment holes 374A-374D. Alignment holes 374A-374D are configured to interact with corresponding features in the alignment guide 380 and an electro-magnetic interference (EMI) plate 390.

Referring now to FIG. 3B, the lens block 370 can also include one or more boss engagement pins 376 configured to engage corresponding holes 236 defined in the thermal boss 230 (both shown in FIG. 2A). As shown in FIG. 3B, the alignment guide 380 includes an upper portion 382A and a lower portion 382B as well as lateral side portions 384A, 384B that define a conduit 385 configured to receive and orient the cable assembly 400 (FIG. 1A). In at least one example, the conduit 385 is configured to allow a portion of the cable assembly 400 (FIG. 1B) to pass at least partially therethrough to couple to the transceiver assembly 300.

The alignment guide 380 also includes external features, such as tabs 386A, 386B on the upper portion and lower portion 382A, 382B respectively that are configured to engage the engagement recesses 260A, 260B in the second end 250B of the lower shell 250 (all shown in FIG. 2B) to thereby orient the alignment guide 380 relative to the lower shell 250.

The alignment guide 380 further includes features that align the alignment guide 380 relative to the EMI plate 390 as well as the transmitter/receiver assembly 360. In particular, the alignment guide 380 includes guide pins 388A-388D that extend toward the transmitter/receiver assembly 360. In the illustrated example, the guide pins 388A-388D are configured to pass through corresponding holes 392A-392D in the EMI plate 390 and into engagement with the alignment holes 374A-374D in the lens block 370 (best seen in FIG. 3A). Accordingly, the EMI plate 390 is configured to be positioned between the alignment guide 380 and the lens block 370.

Figure 3C:
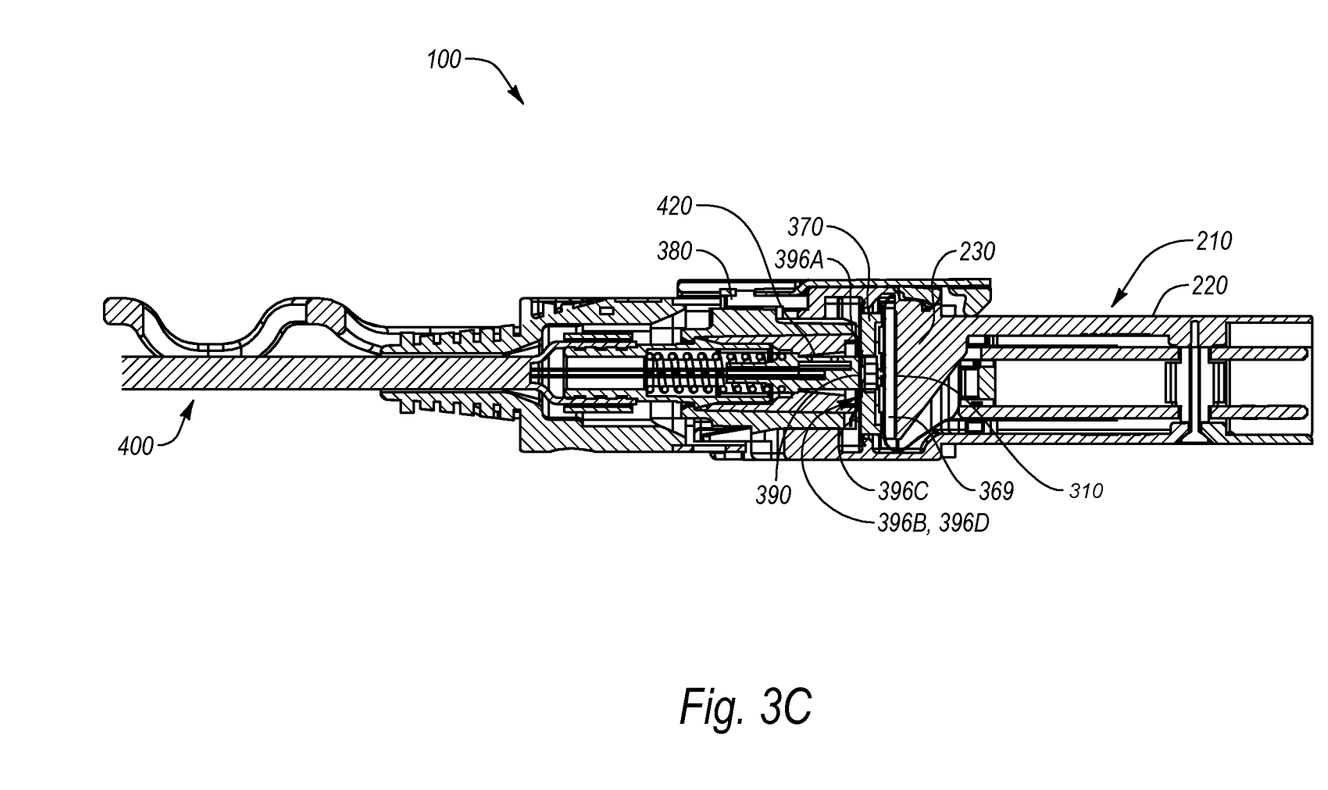
FIG. 3C illustrates a cross-sectional view of the module of FIG. 1A taken along section 3C-3C of FIG. 1A.

Referring again to FIG. 3A, the EMI plate 390 includes a main body 394 and biasing extensions 396A-396D that extend away from the main body 394. Such a configuration can help bias the transmitter/receiver assembly 360 toward a desired position. In particular, FIG. 3C illustrates a cross-sectional view of the module 100 taken along section 3C-3C of FIG. 1A. As shown in FIG. 3C, when the module 100 is assembled, the biasing extensions 396A-396D exert a biasing force between the alignment guide 380 and the lens block 370 to urge the lens block 370 toward the thermal boss 230 associated with the top shell 210. Such a configuration urges the lens block 370 and any intervening components into thermal engagement with the thermal boss 230. The biasing extensions 396A-396D are shown as being integrated with the EMI plate 390 though it will be appreciated that separate biasing members can be provided to urge the lens block 370 toward the thermal boss 230.

The IC plate 369 can be formed of a highly thermally conductive material, such as a metallic material. In at least one example, the IC plate 369 is formed from copper. Forming the IC plate 369 from a highly thermally conductive material allows the IC plate 369 to absorb a substantial amount of the heat generated by operation of the optical transmitters and receivers 368, 366 (best seen in FIG. 3A).

Further, as seen in FIGS. 3B-3C, a layer of thermal interface material 310 can be placed between the IC plate 369 and the thermal boss 230, and more particularly between the IC plate 369 and the planar interface 234 of the thermal boss 230. The thermal interface material 310 may include one or more of a phase change material, one or more thermal pads, thermal grease, or other suitable thermally conductive material(s). Briefly, a phase change material is configured to change phase above a predetermined threshold temperature and fill up gaps between two interfacing surfaces, such as interfacing surfaces of the IC plate 369 and the thermal boss 230. Thermal pads include pads configured to conduct heat across a thermal interface between two interfacing surfaces. Thermal grease is configured to spread out within an interface to enhance thermal conductivity across the interface.

In some embodiments in which the thermal interface material 310 includes a phase change material, the thermal interface material 310 can be a material having a paste consistency at temperatures below the operating temperature of the module 100 that becomes less viscous or liquid near or above the operating temperature of the module 100. In these and other embodiments, as the thermal interface material 310 becomes less viscous, the thermal interface material 310 can flow into any space between the lens block 370 and the IC plate 369.

More generally, the thermal interface material 310 can be a highly thermally conductive material. As a result, the thermal interface material 310 may be configured to enhance the transfer of thermal energy from the IC plate 369 to the thermal boss 230.

The thermal boss 230 can be integrally formed with the panel 220 of the top plate 210, which can be relatively wide and elongate, thereby providing a large surface area to which the thermal energy directed to the thermal boss 230 can be drawn.

In operation, the communications module 100 may be coupled to a host device (not shown) such that the panel 220 may engage a multi-source agreement (MSA) defined heat sink (also not shown). As a result, a thermal pathway may be established between the transmitter/receiver assembly 360 (FIG. 3A) and the heat sink by way of the IC plate 369, the thermal boss 230, and the panel 220. Such a configuration can allow the module 100 to efficiently transfer thermal energy generated by operation of the transmitters and receivers 368, 366 (best seen in FIG. 3A) out of the module 100.

In some embodiments, the transmitters and receivers 368, 366 transmit and receive data by way of the cable assembly 400. The cable assembly 400 is shown in more detail in FIG. 1B. With reference to FIG. 1B, the cable assembly 400 includes a plurality of optical fibers (not shown) disposed within cable cladding 410 and a fiber optic connector 420. In other examples, the cable assembly 400 includes a plurality of electrical wires and an electrical connector, rather than optical fibers and a fiber optic connector 420. Alternately, the cable assembly 400 is omitted altogether in some configurations.

The optical fibers of cable assembly 400 may include, for example, 12 transmit multimode parallel ribbon fibers and 12 receive multimode parallel ribbon fibers, or a total of 24 multimode parallel ribbon fibers. In other examples, the optical fibers are multimode fibers or single mode fibers having any number of transmit fibers and any number of receive fibers implemented in a parallel ribbon or as individual fibers.

As shown in FIG. 3C, the fiber optic connector 420, lens block 370 and lens pins 372A and 372B (FIG. 3A) collectively cooperate to align the optical fibers of the cable assembly 400 with the optical transmitter 368 and optical receiver 366 (both shown in FIG. 3A) such that optical signals can be emitted onto and/or received from the optical fiber(s) of cable assembly 400. Accordingly, the module 100 is configured to be coupled to a host device to transmit data to and receive data from a network over the cable assembly 400.

As previously discussed with reference to FIG. 1B, the communications module 100 can also include a latching mechanism 500. Any suitable latching mechanism can be used or the latching mechanism can be omitted entirely. A suitable latching mechanism similar to the latching mechanism 500 is disclosed in more detail in currently co-pending U.S. patent application Ser. No. 12/573,637 filed Oct. 5, 2009 and entitled "Latching Mechanism for a Module," the disclosure of which is hereby incorporated by reference in its entirety. Another example of a latching mechanism that may be implemented in the communications module 100 is disclosed in U.S. Patent Application Ser. No. 61/295,629 filed Jan. 15, 2010 and entitled "Latching Mechanism for a Module," the disclosure of which is hereby incorporated by reference in its entirety.

Accordingly, a module has been disclosed herein with a thermal mechanical design. In at least one example, the module includes a shell assembly configured to house a transceiver assembly. The transceiver assembly has one or more printed circuit boards that are oriented in or parallel to a printed circuit board interface plane. The shell assembly includes a thermal boss having an interface plane that is oriented at an angled to the printed circuit board interface plane. In particular, the interface plane of the thermal boss can be generally perpendicular to the printed circuit board interface plane. The thermal boss can also include an angled surface that extends away from the interface plane to the shell assembly such that a thermal pathway is defined from the thermal boss to the shell assembly. Such a configuration can allow the module to efficiently remove heat generated by operation of the module.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A communications module, comprising:
a transceiver assembly having at least one printed circuit board defining a printed circuit board interface plane and a transmitter/receiver assembly coupled to the printed circuit board, the transmitter/receiver assembly being oriented at a first angle relative to the printed circuit board interface plane; and
a shell assembly defining a cavity therein, the transceiver assembly being positioned within the cavity, wherein the shell assembly further comprises a thermal boss including a thermal interface surface defining a thermal interface plane, the thermal interface plane being oriented at a second angle relative to the printed circuit board interface plane,
wherein the transceiver assembly includes a transmitter, a receiver, and a lens block in thermal communication with the thermal boss, the communications module further comprising a biasing member configured to bias the lens block toward the thermal boss.

2. The communications module of claim 1, wherein the thermal interface plane is substantially perpendicular to the printed circuit board interface plane such that the second angle is about 90 degrees.

3. The communications module of claim 1, further comprising an alignment guide configured to be positioned at least partially within the shell assembly, wherein the biasing member is positioned between the alignment guide and the lens block.

4. The communications module of claim 3, further comprising an electromagnetic interference (EMI) plate having a main body, wherein the biasing member includes protrusions extending away from the main body.

5. The communications module of claim 4, wherein:
the protrusions of the EMI plate extend both away from the main body of the EMI plate and in a first direction parallel to the printed circuit board interface plane; and
the EMI plate further comprises a plurality of fingers that extend around a perimeter of the EMI plate both away from the main body of the EMI plate and in a second direction that is opposite the first direction.

6. The communications module of claim 1, further comprising an integrated circuit plate positioned between the lens block and the thermal boss, the transmitter and receiver being positioned on the integrated circuit plate.

7. The communications module of claim 6, further comprising at least one thermal interface material positioned between the integrated circuit plate and the thermal boss.

8. The communications module of claim 7, wherein the thermal interface material includes at least one of a phase change material, one or more thermal pads, or thermal grease.

9. The communications module of claim 1, wherein the transceiver assembly comprises a first printed circuit board that defines the printed circuit board interface plane and a second printed circuit board that defines a second plane that is parallel to and offset from the printed circuit board interface plane.

10. The communications module of claim 9, further comprising an integrated circuit plate that defines a third plane that is orthogonal to the printed circuit board interface plane and the second plane, wherein the transmitter and the receiver are positioned on the integrated circuit plate.

11. The communications module of claim 1, wherein the transmitter comprises an array of lasers and the receiver comprises an array of photodiodes.

12. The communications module of claim 11, wherein the array of lasers comprises a 12×1 array of vertical cavity surface-emitting lasers and the array of photodiodes comprises a 12×1 array of p-type, intrinsic, n-type photodiodes.

13. A communications module, comprising:
a shell assembly having a top panel, a bottom panel, and opposing lateral sides defining a cavity therebetween;

a thermal boss extending from the top panel, the thermal boss including a thermal interface surface defining a thermal interface plane oriented at a first angle relative to the top panel;

a transceiver assembly having at least one printed circuit board defining a printed circuit board interface plane that is substantially parallel to the top panel and a transmitter/receiver assembly coupled to the printed circuit board and oriented at a second angle relative to the printed circuit board interface plane, the second angle being substantially equal to the first angle; and a biasing member configured to bias the transmitter/receiver assembly into contact with the thermal interface surface.

14. The communications module of claim 13, wherein the first angle is about 90 degrees.

15. The communications module of claim 13, further comprising a thermal interface material positioned between the thermal interface surface and the transmitter/receiver assembly.

16. The communications module of claim 13, wherein the transmitter/receiver assembly includes a transmitter and a receiver coupled to an integrated circuit plate.

17. The communications module of claim 13, further comprising at least one flex circuit coupling the printed circuit board to the transmitter/receiver assembly.

18. The communications module of claim 13, wherein the transceiver assembly is an optoelectronic transceiver assembly.

19. The communications module of claim 13, further comprising an alignment guide coupled to the shell assembly and extending at least partially into the cavity; the biasing member being positioned between the alignment guide and the thermal boss.

20. The communications module of claim 13, wherein the transceiver assembly comprises a first printed circuit board that defines the printed circuit board interface plane and a second printed circuit board that defines a second plane that is parallel to and offset from the printed circuit board interface plane.

21. The communications module of claim 20, further comprising an integrated circuit plate that defines a third plane that is orthogonal to the printed circuit board interface plane and the second plane, wherein a transmitter and a receiver of the transmitter/receiver assembly are positioned on the integrated circuit plate.

22. The communications module of claim 21, wherein the transmitter comprises a 12×1 array of vertical cavity surface-emitting lasers and the receiver comprises a 12×1 array of p-type, intrinsic, n-type photodiodes.

* * * * *